United States Patent Office 2,772,233
Patented Nov. 27, 1956

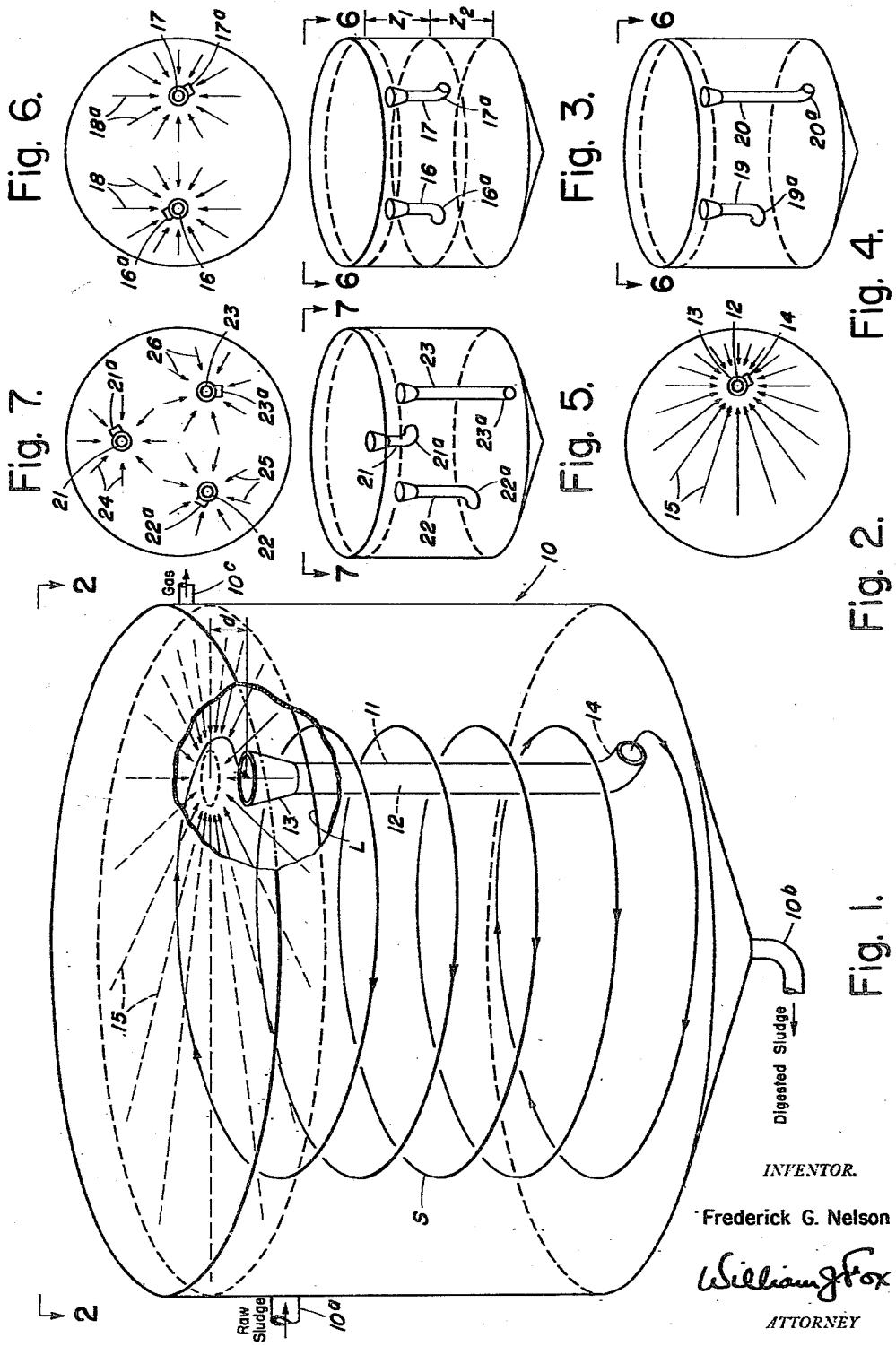

2,772,233

ANAEROBIC DIGESTION TANKS WITH DIGESTING MECHANISM

Frederick G. Nelson, La Habra, Calif., assignor to Dorr-Oliver Incorporated, a corporation of Delaware Application July 26, 1954, Serial No. 445,650

3 Claims. (Cl. 210—2)

This invention relates to the anaerobic digestion of sewage sludge in a closed digester tank in which the mass of sludge is to be kept in a state of agitation or mixing or movement for the purpose of maintaining and promoting anaerobic digestive action in that mass. The purpose of such mixing or movement itself being to provide the anaerobic bacteria with fresh food so that their life cycle and rate of propagation may be maintained and encouraged. Therefore, power driven self-contained draft tube mixing units are well known adjuncts to modern anaerobic digester tanks, and it is the practice to provide either one or more of such units in a tank to produce agitation or movement in a sludge favorable to bacterial digestion.

Such a well known draft tube mixing unit usually comprises a vertical draft tube rising from near the tank bottom or else from a pedestal thereon, with outlet ports provided to dischareg in all directions from the lower end of the tube, which outlets impose an abrupt directional change of the discharging liquid from the vertical to the horizontal direction. The upper end or mouth or intake of the draft tube terminates a suitable relatively short distance below the normal sludge level in the tank so that scum and floating material will be drawn into the tube. Usually, a power driven self-contained propeller agitator unit is mounted in the tube of such a tank, providing a vertical propeller shaft with its propeller-carrying lower end extending into the mouth of the draft tube so that rotation of the propeller will continuously impel sludge from the top strata of the tank contents through the tube to the lower strata of the tank contents.

This invention more specifically relates to improvements in the effectiveness of such draft tube mixing units relative to the total mass of sludge in the tank, the object being to provide more homogeneous mixing and agitation for sludge movement to extend to and into substantially all portions of the total mass of sludge in the tank at any one time, thus to improve upon the localized mixing effects of the present day individual draft tube mixing units for such digesters.

To attain that object, the invention requires that at least one such draft tube be provided and disposed at a point eccentrically in the tank, and that moreover the lower or discharge end of the draft tube be curved in the form of an exit elbow portion for effecting relatively gradual change of the discharging liquid from the vertical to the horizontal direction, with the additional proviso that this horizontal direction be aimed at such an angle with respect to the surrounding tank wall as to induce a horizontally circulating or spiralized movement in the mass of sludge throughout the sequential horizontal zones thereof. By inducing such a spiralized movement in the mass of sludge there is imparted to the sludge a relatively large horizontal velocity component along with a very small vertical upward velocity component, whereby the sludge eventually reaches the upper zone or strata along such a spiralized path, in which top strata the sludge is then drawn back into the mouth or intake end of the draft tube for recirculation.

According to a more specific feature, the elbow shaped discharge end of such a draft tube is disposed adjacent to and directed towards an intermediate portion of the slightly sloping conical bottom of the tank, with the result that there is produced in the bottom zone a mixing effect extending into the outer ranges of that zone and thus even into the peripheral bottom corner of the tank.

According to one embodiment the tank is provided with a plurality of such eccentrically disposed mixing units having their elbow shaped discharge ends cooperatively directed in the sense that they will coact in providing a conjoint effect of horizontally spiralized circulatory sludge movement within the mass of digesting sludge in the tank to the end of attaining a relatively homogenized condition throughout the mass of sludge in the tank. Such an arrangement may apply to what is known as a two-stage digestion system, where the sludge with a major portion thereof digested is transferred from a state of agitation in a primary tank to a state of relative quiescence in the secondary tank for final digestion as well as for the purpose of separating the so-called supernatant liquid from the final digested sludge that is being withdrawn from the bottom of the secondary tank.

According to a more specific embodiment, a plurality of draft tube mixing units are so constructed and disposed in the primary digester tank that their exit elbow ends are disposed in the primary digester tank and in a manner to tend to homogenize the mixing effect throughout the mass of sludge in the tank.

According to another embodiment, the homogenizing effect from one or more of the mixing units according to this invention, is substantially confined to an upper portion or zone of the sludge mass in the tank to accelerate digestion in that zone while the lower portion or zone containing largely digested sludge is left substantially stagnant to allow for final digestion although at greatly retarded rate and for the withdrawal of digested sludge directly from the bottom of the tank. That is to say, the elbow discharge ends of the mixing units are spaced upwardly at least a distance sufficient to provide for relative quiescence in the aforementioned bottom zone of the sludge contents in the tank which is thus known to be operated as a single stage digester tank in distinction from the aforementioned two-stage digestion system.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents are therefore intended to be embraced by those claims.

In the drawings, Figure 1 is a diagrammatic view in perspective of the digester tank illustrating by flow lines the spiralized motion induced in the tank contents, as exemplified by the provision of a draft tube mixer unit disposed eccentrically in the tank.

Figure 2 is a plan view in reduced scale of the Figure 1 arrangement, showing flow lines of the top strata of the tank contents converging toward the mouth of the draft tube of the mixer unit.

Figures 3, 4, 5 are perspective views although in a reduced scale, similar to that of Figure 1, to illustrate various arrangements in which pluralities of draft tube mixer units are provided in the tank.

Figure 6 is a plan view of the Figures 3 and 4 embodiments respectively, showing flow lines of the top strata of the tank contents converging toward the respective intake ends or mouth of the draft tubes of the respective mixer units.

Figure 7 is a plan view of the Figure 5 embodiment showing flow lines of the top strata of the tank contents converging toward the respective intake ends of the draft tubes of the mixer units.

Figure 8:
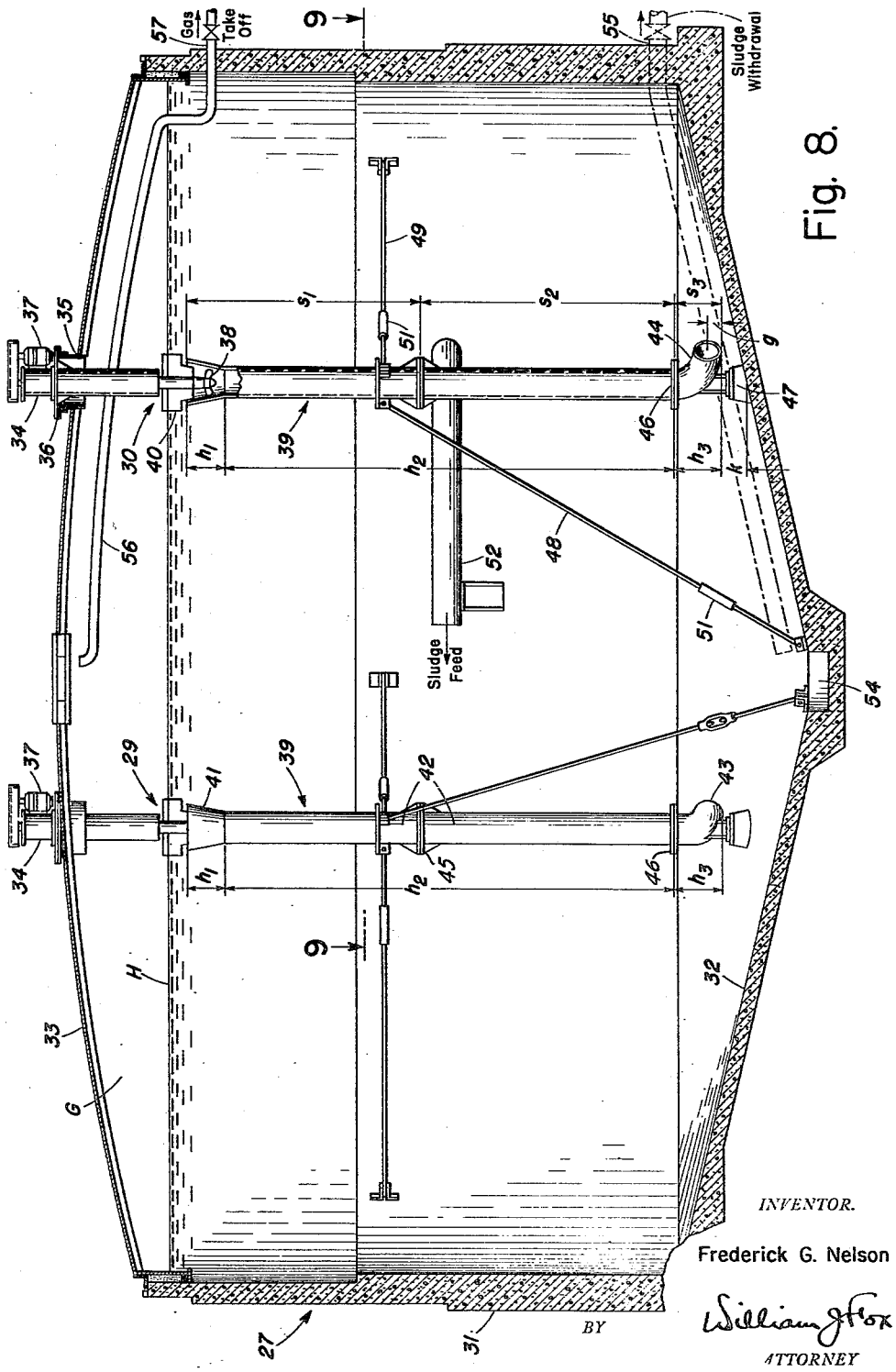
Figure 8 shows the invention structurally more fully implemented, and embodied in a digester tank provided with three eccentrically disposed draft tube devices.

The basic concept of inducing certain movements of a spiralized character in the body of sludge is diagrammatically indicated in phantom perspective Figure 1. That is, the tank 10 has provided in it a single draft tube mixer unit here merely indicated as by a draft tube 11 the intake end or mouth of which is submerged and terminates a suitable short distance "d" below the sludge level L in the tank. The draft tube 11 comprises a vertical tube portion 12 terminating upwardly in a conically widening mouth portion 13 and downwardly in an elbow shaped exit portion 14. Significantly, the elbow portion 14 has its exit end horizontally directed and disposed in such a manner or at such an angle with respect to the surrounding tank wall, that there is induced in the tank contents or body of digesting sludge a spiralized motion which is here diagrammatically indicated by the spiral line S. Thus, the motion engendered in the body of sludge has a relatively large horizontal velocity component and a very small upward velocity component. In this way, by way of spiralized movement the sludge particles reach the top strata or zone where they move convergingly towards the mouth of the draft tube 11 as is indicated by converging flow lines 15 (see Figure 2). The tank 10 is shown to have a raw sludge inlet $10^a$, a discharge $10^b$ for digested sludge, and a gas discharge connection $10^c$.

The embodiment of Figure 3 comprises a pair of identical draft tube mixer units indicated as by draft tubes 16 and 17 having respective elbow shaped exit ends $16^a$ and $17^a$ shown to be arranged diagrammatically opposed to one another, both draft tubes here extend only part way or half way down into the body of sludge thus terminating substantially at the same level or at the same distance from the bottom of the tank. In this way, it is only the upper portion or zone $Z_1$ of the sludge body that is subjected to the joint effect of spiralized agitation induced by the two coacting mixer units to accelerate digestion, whereas the lower portion or zone $Z_2$ of the sludge body, namely that which is below the exit ends of the draft tubes, is left substantially quiescent and thus in a condition for final digestion although at a greatly retarded rate. In other words, the Figure 3 arrangement of the mixer units allows for so-called single stage or single tank digestion in which a zone of agitation and accelerated digestion overlies a zone of relative quiescence and to encourage sedimentation of the digested solids in order that digester sludge may be withdrawn from that zone. Since the elbow shaped exit ends of the two draft tubes have coacting relationship with respect to one another, they will induce in the sludge the desired spiralized movement graphically indicated in Figure 1, although more fully developed or more intensified or better equalized. The return movements of the sludge in its top strata of the digesting mass are here indicated as by groups of flow lines 17 and 18 (see Figure 6), the flow lines in each group being directed convergingly towards the mouth portion of a respective intake end of a respective draft tube mixer unit.

The Figure 4 modification while also showing a pair of mixer units 19 and 20 differs from the Figure 3 embodiment by having the respective exit elbow ends $19^a$ and $20^a$ of the draft tubes terminate each at a different level in the body of digesting sludge, thus maintaining the entire body of the sludge in the tank subjected to the effect of the spiralized movement engendered therein by the mixer units, this net effect being due to the coaction of the elbow exit ends with respect to one another. The return movement of the thus circulating sludge in the top strata may be in the nature of converging flow lines substantially like those indicated in Figure 6.

The Figure 5 embodiment represents a further development of the Figure 4 embodiment, in that it comprises the arrangement of three equidistantly spaced mixer units indicated by their respective draft tubes 21, 22, 23. These draft tubes have elbow shaped exit ends $21^a$, $22^a$, $23^a$ respectively each of which is spaced a different distance from the bottom of the tank. By the coaction of the elbow shaped exit ends a desired spiralized agitative movement is induced in the body of digesting sludge, whereas the sludge return in the extreme top strata of the sludge body appears as indicated by three groups of flow lines 24, 25, 26 (see Figure 7), each such group having its flow lines convergingly directed towards a respective intake end of a respective draft tube or mixer unit.

Figure 9:
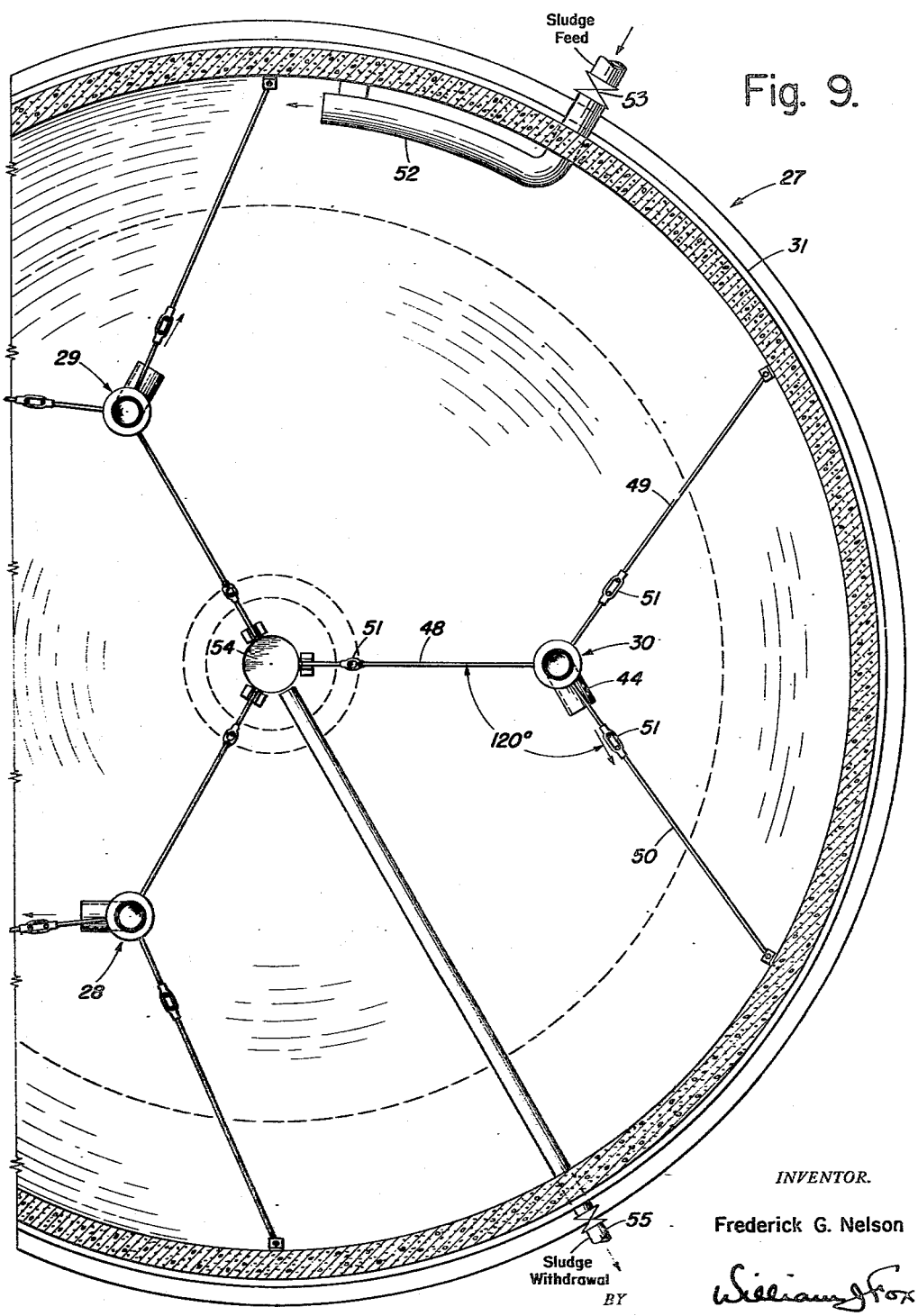
Figure 9 is a cross-sectional view of the digester tank taken on line 9—9 of Figure 8.

The structural implementation of a practical embodiment of a digester tank 27 provided with three mixer units 28, 29, 30 is shown in Figures 8 and 9. The tank 27 of concrete comprises a wall 31 and a bottom 32 shaped in the way of an inverted shallow cone. The tank is closed by a fixed top structure 33 here shown to be of steel construction. Each mixer unit comprises a self-contained power driven agitator unit 34 mounted in and carried by the top structure 33. This agitator unit extends through an upward vertical flanged neck 35 of the top strata and has a flange-connection 36 therewith. This agitator unit is individually powered as by motor 37, and has a vertical impeller shaft the lower end of which carries the impeller 38. Such an agitator impeller unit is well known of itself and its construction may be such as in the Patent No. 2,647,733 to J. H. Knowles, et al., issued August 4, 1953.

The lower end of the impeller shaft with the impeller extends into the intake end or mouth of a vertical draft tube 39 which together with the agitator impeller unit constitutes the aforementioned mixer unit. The agitator unit is here also shown to comprise stationary vane structure 40 surrounding the impeller shaft for rectifying the flow of the liquid entering the draft tube 39.

The draft tube 39 comprises a flaring or funnel shaped intake portion 41 of the height "$h_1$," a vertical straight tube portion 42 of the height "$h_2$," and an elbow shaped exit portion 43 of the height "$h_3$" and terminating a clear distance "$k$" from the tank bottom. The horizontally extending leg 44 of the exit portion 43 is here shown to be directed so as to constitute with the connecting line between the center of the tank and the center of the draft tube an obtuse angle of 120°.

The draft tube is here shown to comprise three sections $S_1$, $S_2$, $S_3$ being connected with one another as by flange connections 45 and 46. The draft tube 39 is supported upon the tank bottom by a footing 47 and is braced off by means of guy rods 48, 49, 50 provided with turnbuckles 51 and anchored upon the tank wall and upon the tank bottom respectively.

Feed of raw sludge to the tank is supplied by a feed pipe 52 shown to have a control valve 53. Digested sludge is drawn or pumped from a low point or sump 54 of the tank bottom, this being controlled by a valve 55. A gas discharge pipe 56 provided with control valve 57 is shown to indicate the release of digester gas from the gas dome or gas space "G" above the liquid level "H" of the body of sludge in the tank.

In the Figures 1 and 2 embodiment it is noted that the three mixer units are disposed equidistantly with respect to one another and about half way the radial distance between the center of the wall of the tank. The lower or exit end of the draft tube of each mixer unit terminates close to the tank bottom only a distance $k$ spaced therefrom so that the direction of the flow of liquid issuing horizontally from the elbow shaped end portion of the draft tube constitutes an angle g with the shallow slope of the tank bottom. In this way, the force of each of the issuing streams is deflected and flattened out as it converges with the slope of the bottom, and is thus effective to clear the peripheral bottom corner of the tank of accumulations of solids or grit that might occur.

I claim:

1. The method of treating a body of anaerobically digestible sewage sludge in a round digester tank while maintaining a substantially constant sludge level therein as fresh sludge is being introduced into, and digested sludge being withdrawn from the tank, and while scum from the top strata of said body is being depressed into said body by way of a plurality of vertically induced downdraft streams spaced substantially uniformly from one another about the center of the tank, which method comprises orienting the vertical downward direction of each of said streams by way of gradual transition into substantially horizontal direction, so that the respective horizontal directions of said streams are codirectionally disposed and oriented with respect to the tank wall as well as with respect to one another, each at an obtuse angle relative to the tank radius as defined by two points namely the vertical axis of the respective vertical downdraft stream and vertical axis of the tank, whereby an outward velocity component of each respective horizontal stream direction is aimed at an adjacent bottom corner portion of the tank, while an upward velocity component induces in the body of digesting sludge a spiralized upward path of sludge movement, whereby there are maintainable in effect sequential horizontal strata of intermixing sewage matter and thus a substantially uniform distribution of gasifiable sludge solids throughout said body of digesting sludge along with depression and elimination of the scum.

2. The combination of a cylindrical digester tank anaerobic sewage sludge digestion, provided with a roof structure and with a plurality of vertical draft tube units spaced from the tank wall and about the center of the tank and distributed substantially evenly with respect to one another in said tank, each draft tube unit having an outlet portion terminating near the tank bottom and an inlet portion terminating below the normal sewage level in the tank a distance sufficient for floating scum together with liquid to be drawn convergingly towards and into each respective inlet portion whereby said scum is depressed into the tank contents, each draft tube unit also having a motorized propeller mechanism supported by said roof structure and comprising a vertical propeller shaft extending downwardly into said tank for effecting down draft passage through the tube of said scum and liquid by the propeller operating in said mouth portion, characterized thereby that the outlet end of each draft tube comprises an elbow-shaped terminal conduit portion for effecting a gradual change of flow direction from downward vertical to substantially horizontal in each draft tube unit, the horizontal exit ends of the elbow portions being codirectionally disposed and oriented, with respect to the tank wall and with respect to one another, each at an obtuse angle relative to the tank radius as defined by two points namely the vertical axis of the respective draft tube and the vertical axis of the tank, whereby an outward velocity component of each respective emitting stream is arrived at an adjacent bottom corner portion of the tank, while an upward velocity component induces in the body of digesting sludge a spiralized path of sludge movement from the bottom to the top strata thereof, whereby there are maintainable in effect sequential horizontal strata of intermixing sewage matter and thus a substantially uniform distribution of gasifiable sludge solids throughout said body of digesting sludge along with depression and elimination of the scum.

3. Apparatus according to claim 2, in which the tank bottom has a shallow conical incline, and the exit elbows are oriented in a manner to emit streams at an acute angle relative to that incline, whereby the stream energy is gently deflected and spread over the peripheral bottom zone of the tank.

References Cited in the file of this patent

UNITED STATES PATENTS

| 1,733,244 | Smith | Oct. 29, 1929 |
| 2,522,281 | Koskinen | Sept. 12, 1950 |
| 2,647,733 | Knowles et al. | Aug. 4, 1953 |

FOREIGN PATENTS

| 552,336 | Great Britain | Apr. 2, 1943 |
| 563,988 | Great Britain | Sept. 7, 1944 |